United States Patent
Walker, Jr. et al.

(10) Patent No.: US 8,550,619 B2
(45) Date of Patent: Oct. 8, 2013

(54) REMOVABLE LENS EYEWEAR SYSTEM

(75) Inventors: Richard Lee Walker, Jr., New York, NY (US); Silvano Derudi, Tradate Varese (IT)

(73) Assignee: Maui Jim, Inc., Peoria, IL (US)

( * ) Notice: Subject to any disclaimer, the term of this patent is extended or adjusted under 35 U.S.C. 154(b) by 307 days.

(21) Appl. No.: 13/162,291

(22) Filed: Jun. 16, 2011

(65) Prior Publication Data

US 2012/0320331 A1   Dec. 20, 2012

(51) Int. Cl.
*G02C 1/04* (2006.01)

(52) U.S. Cl.
USPC ............................................. 351/106; 351/86

(58) Field of Classification Search
USPC ................. 351/103, 106, 86, 83, 92, 90, 124, 351/128, 41
See application file for complete search history.

(56) References Cited

U.S. PATENT DOCUMENTS

| 5,410,763 | A | 5/1995 | Bollé |
| 5,428,410 | A | 6/1995 | Lei |
| 5,790,230 | A | 8/1998 | Sved |
| 6,561,647 | B1 * | 5/2003 | Chen ............................. 351/103 |
| 6,779,886 | B2 | 8/2004 | Huang |
| 6,991,333 | B2 | 1/2006 | Van Atta et al. |
| 7,219,993 | B1 | 5/2007 | Chiou |

* cited by examiner

*Primary Examiner* — Hung Dang

(74) *Attorney, Agent, or Firm* — Brinks Hofer Gilson & Lione

(57) ABSTRACT

A removable lens eyewear system is provided that substantially prevents accidental or unintended removal, axial movement, linear movement, and rotational movement of a removable lens relative to an eyewear frame, such as in a side-to-side, up-and-down, back-and-forth, and rotational direction, as well as the unintended disconnection of the removable lens from the eyewear frame, while at the same time providing easy, one-handed operation for the engagement and disengagement of the removable lens from the system.

20 Claims, 7 Drawing Sheets

REMOVABLE LENS EYEWEAR SYSTEM

TECHNICAL FIELD

The present invention relates to eyewear and more particularly to a removable lens system for use with eyewear, including but not limited to, eyeglasses, sunglasses, eyeshields, goggles, and safety glasses.

BACKGROUND

Conventional eyewear typically includes a frame having temples for resting on one's ears, a bridge for resting on or near one's nose, and one or more lenses for viewing therethrough. The lens may be configured to assist the user's eyesight, as in the case of prescription spectacles, configured to protect the user from the sun's rays, as in the case of sunglasses, configured to protect the user's eyes from contamination, as in the case of eyeshields, goggles, and safety glasses, or configured to improve performance, such as in the case of ski goggles. Eyewear is commonly worn in daily life for a variety of purposes, whether it be for eyesight improvement, fashion, safety, or some combination thereof.

Eyewear is known that includes one or more user-replaceable lens elements. Such devices typically require two hands for removal and replacement of a lens element, or the connection used may be insufficiently secure to prevent a lens element from becoming displaced or even removed during vigorous activity by a wearer.

BRIEF SUMMARY

In a first aspect, a removable lens eyewear system is provided having a frame including a first temple, a second temple, a surface having a first portion, a second portion, and a middle portion between the first portion and the second portion, wherein the middle portion includes a bridge, wherein the first portion is connected to the first temple and the second portion is connected to the second temple, and wherein the first portion and the second portion are configured for viewing therethrough; at least one removable lens including a surface configured for viewing therethrough; an engagement member disposed about the surface; and a plurality of protrusions extending from the surface; a lens-securing assembly connected to the bridge, wherein the lens-securing assembly includes a pin; an actuation member in communication with the pin, wherein the actuation member is configured to position the pin in a retracted state when a force is applied to the actuation member such that the pin does not engage the engagement member of the removable lens, and wherein the actuation member is further configured to position the pin in an extended state when the force is removed such that the pin engages the engagement member of the removable lens; and a plurality of recesses configured for slideably receiving the plurality of protrusions of the removable lens.

In a second aspect, a lens-securing assembly is provided having a pin; an actuation member in communication with the pin, wherein the actuation member is configured to position the pin in a retracted state when a force is applied to the actuation member such that the pin does not engage a removable lens, and wherein the actuation member is further configured to position the pin in an extended state when the force is removed such that the pin engages a removable lens; and a plurality of recesses configured for slideably receiving a plurality of protrusions of a removable lens; wherein the lens-securing assembly is configured for attachment to a bridge of an eyewear frame.

In a third aspect, a removable lens eyewear system is provided having a removable lens; and a lens-securing assembly configured for connection to a bridge of an eyewear frame, wherein the lens-securing assembly includes an actuation means configured to engage and disengage the lens-securing assembly for a removable connection with the removable lens; wherein the lens-securing assembly further includes means for substantially preventing the side-to-side, up-and-down, back-and-forth, and rotational motion of the removable lens relative to the lens-securing assembly when the removable lens is engaged with the lens-securing assembly.

BRIEF DESCRIPTION OF THE SEVERAL VIEWS OF THE DRAWINGS

The embodiments will be further described in connection with the attached drawing figures. It is intended that the drawings included as a part of this specification be illustrative of the exemplary embodiments and should in no way be considered as a limitation on the scope of the invention. Indeed, the present disclosure specifically contemplates other embodiments not illustrated but intended to be included in the claims.

DETAILED DESCRIPTION OF PRESENTLY PREFERRED EMBODIMENTS

Figure 1:
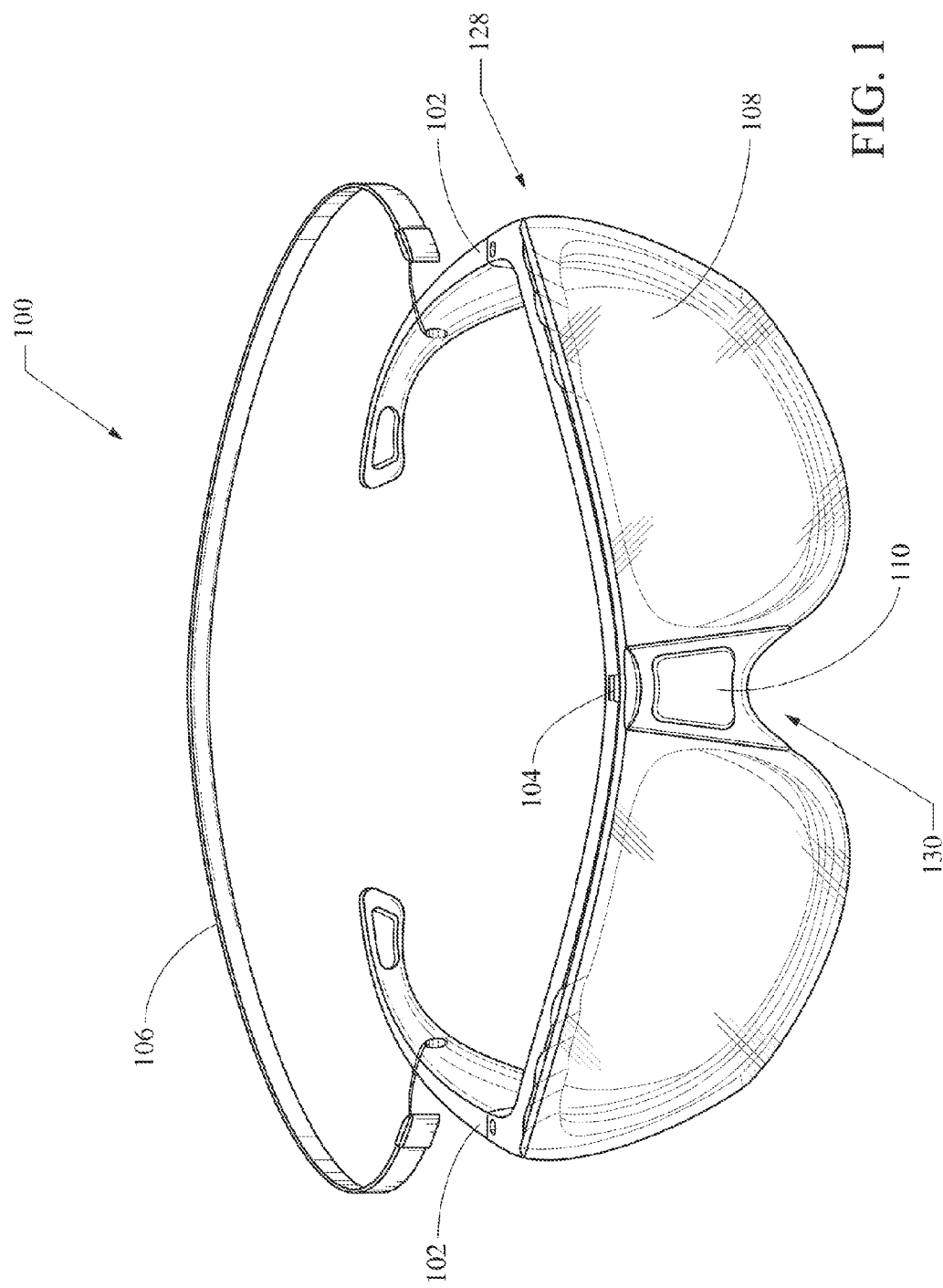
FIG. 1 illustrates a perspective view of a removable lens eyewear system embodiment wherein the removable lens is engaged.

The exemplary embodiments illustrated herein provide exemplary removable lens eyewear apparatuses, systems, and methods. The present invention is not limited to those embodiments described herein, but rather, the disclosure includes all equivalents and those intended to be included in the claims. Moreover, the embodiments and principles illustrated can be used and applied to any type of eyewear, including but not limited to, eyeglasses, spectacles, sunglasses, eyeshields, goggles, safety/protective glasses/goggles, fashion eyewear, ski goggles, motorcycle glasses, cycling glasses, hunting/shooting glasses, and military spectacles. Additionally, the present invention is not limited to the sizes, shapes, materials, or configurations illustrated.

A more detailed description of the embodiments will now be given with reference to FIGS. 1-10. Throughout the disclosure, like reference numerals and letters refer to like elements. The present disclosure is not limited to the embodiments illustrated; to the contrary, the present disclosure specifically contemplates other embodiments not illustrated but intended to be included in the claims. It is understood that the figures may not be illustrated to scale.

It has been discovered that engineering a novel removable lens eyewear system provides many benefits, including but not limited to, a secure connection of a removable lens to a frame such that the lens will not move or disconnect during use and may provide easy, efficient, one-handed operation for the removal and replacement of the removable lens when the system is disengaged such that a broken lens or different lens may be easily engaged.

FIG. 1 illustrates a perspective view of an exemplary removable lens eyewear system 100 wherein a removable lens element 108 is engaged. A frame 128 includes temples 102 configured to engage a user's ears and to secure eyewear 100 to a user. Other securing means are contemplated, including but not limited to, a strap 106. A bridge 104 rests on a user's nose orientating the frame 128 such that user's eyes may be directed for viewing through the frame 128. A pair of separate lenses 112 (illustrated in FIG. 2) are illustrated in this embodiment as being connected to and generally encircled by the frame 128.

It is contemplated that the removable lens 108 and lenses 112 may be formed from the same or different materials, including from any eyewear lens material in whole or in part, including but not limited to, plastics, polycarbonates, trivex, glass, or any other materials known, used in the eyewear industry including multicomponent and/or proprietary constructions, or developed for use in lenses including organic and inorganic materials, one exemplary material, including but not limited to, CR-39.

The removable lens element 108 and/or lenses 112 may be covered in whole or in part with a coating, including but not limited to, anti-reflective materials, scratch-resistant materials, and/or other coatings, may be configured in whole or in part to include, for example, ultraviolet treatments, polarized treatments, and photochromatic treatments, as well as with CR-39 and other organic and inorganic lens materials.

It is contemplated that additional features may be incorporated into the removable lens element 108 and/or lenses 112, including but not limited to, a laser filter, as well as tailoring the removable lens filter 108 and/or the lenses 112 for specific tasks or risks, including but not limited to, laser blinding-flash, polarization for high reflective glare, heat reflectivity, as well as an impact protective element for the protection of potentially delicate prescription lenses. It is also contemplated that the removable lens element 108 and/or lenses 112 may be prescription lenses or otherwise configured to correct, modify, or alter a user's vision.

The removable lens element 108 and/or lens 112 (which may be configured as removable) may be configured for a variety of purposes, in whole or in part, including but not limited to, use as sunglasses, to correct, modify, or alter a user's vision, to improve performance (including but not limited to, as when skiing or used in other sports), to protect one's eyes from contaminant (including but not limited to, foreign materials, blood, chemicals, solid matter, liquid matter, and gaseous matter), or any combination thereof. They may be constructed to comply with ANSI or other standards for impact resistance, and/or other safety features. They may be tinted or otherwise treated to provide a particular light transmission profile that is desirable for a given use or plurality of uses such as, for example, water sports, operating firearms, low-light conditions, snow skiing, or any other general or specialized use.

In certain embodiments, the frame portion will not include lenses 112 and may therefore be open/vacant.

A lens-securing assembly 130 is attached to the bridge 104. The assembly 130 includes an actuation button 110 for disengaging and engaging the lens-securing assembly 130 with the removable lens element 108 such that the removable lens element 108 is able to be removed and/or inserted thereto. Other actuation means are contemplated, including but not limited to, a lever or any other mechanical structure appropriate for actuating the assembly described herein or equivalents.

Figure 2:
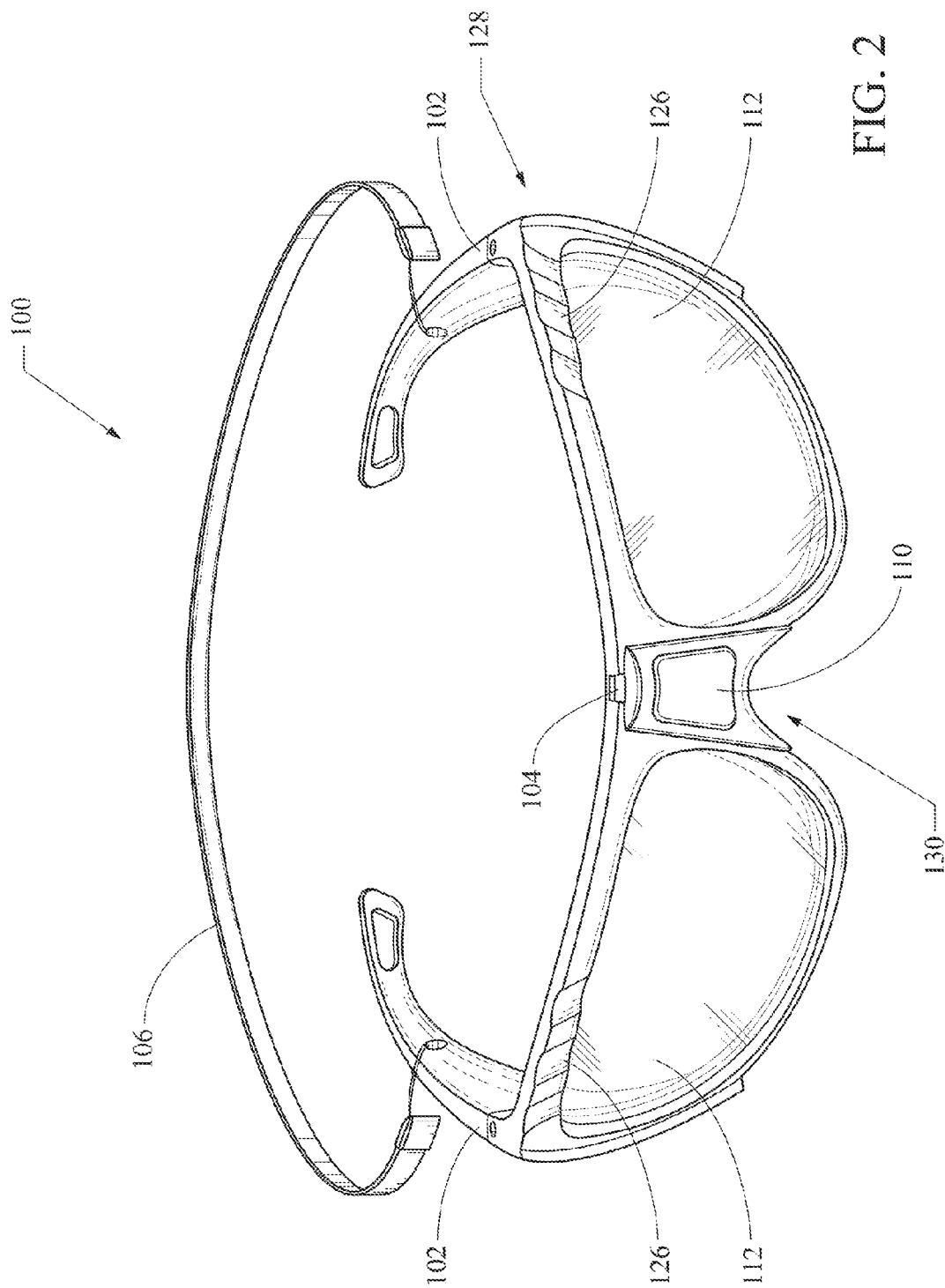
FIG. 2 illustrates a perspective view of a removable lens eyewear system embodiment wherein the removable lens is disengaged.

FIG. 2 illustrates a perspective view of an exemplary removable lens eyewear system 100 wherein the removable lens element 108 (as illustrated in FIG. 1, embodied as a shield-type lens element) is disengaged after having been disconnected from the lens-securing assembly 130 of the frame 128. The frame 128 may include vents 126, which may be embodied—for example—as a wavy surface, for the passage of air between frame 128 and removable lens element 108. This structure may enhance user comfort and may also decrease the likelihood that lenses 112 (if present) and/or the lens element 108 may become fogged during use/wear.

The frame 128 and/or the removable lens element 108 may include a permanent or removable gasket, pad, or other structure disposed between them (preferably near or bordering one or more edges in a manner that may form a seal between the frame and lens) configured to provide protection from, for example, water, dust, and/or impact.

Figure 3:
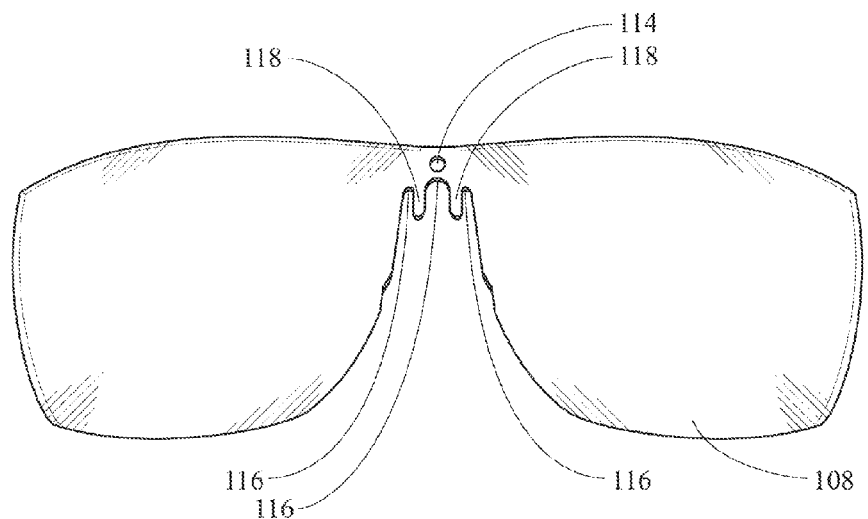
FIG. 3 illustrates a front view of a removable lens embodiment.
Figure 4:
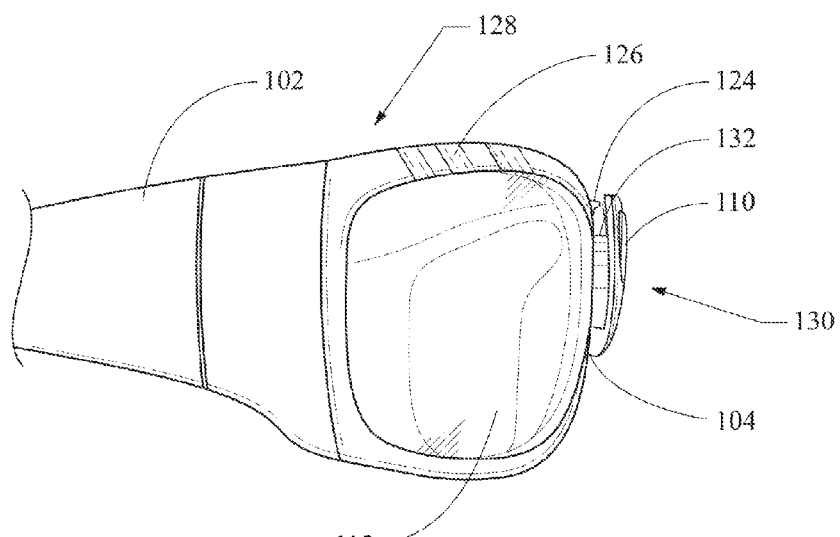
FIG. 4 illustrates a side view of a lens-securing assembly embodiment configured for use with a removable lens eyewear system, with no removable lens present.
Figure 5:
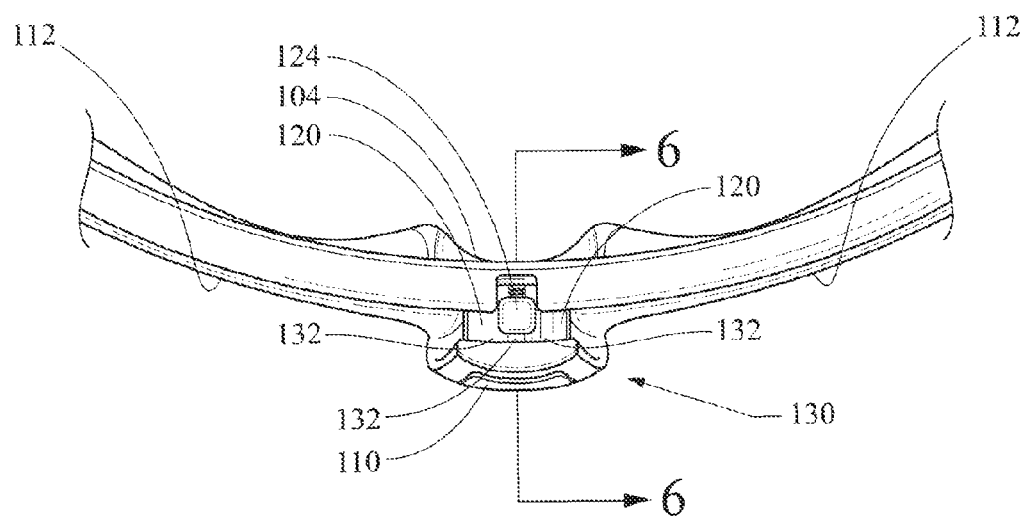
FIG. 5 illustrates a top view of the lens-securing assembly of FIG. 4, configured for use with a removable lens eyewear system, with no removable lens present.

FIG. 3 illustrates a front view of an exemplary removable lens element 108 for use with the lens-securing assembly 130 (illustrated in FIGS. 1 and 2), FIG. 4 illustrates a side view of the exemplary lens-securing assembly 130 for use with a removable lens eyewear system 100 wherein the removable lens element 108 is disengaged, and FIG. 5 illustrates a top view of the exemplary lens-securing assembly 130 configured for use with removable lens eyewear system 100 with the removable lens element 108 disengaged.

Referring to FIGS. 2-5, the removable lens element 108 is configured to provide a substantially secure, tight, and stable connection with the lens-securing assembly 130 and the frame 128, such that the removable lens element 108 cannot be removed from the lens-securing assembly 130 without first disengaging the lens-securing assembly 130. Moreover, when the lens-securing assembly 130 is engaged with the removable lens element 108, the removable lens element 108 is fixed such that there most preferably is substantially no axial, linear, or rotational movement relative to the lens-securing assembly 130 and the frame 128. A small amount of such movement may be allowed as a result of manufacturing tolerances, but it is preferable that any movement be sufficiently limited that a wearer's vision will not be altered or impaired by the movement, and most preferable that any movement permitted would be sufficiently minimal as to generally be substantially imperceptible to a wearer. Thus, the removable lens element 108 is generally fixed and connected to the lens-securing assembly 130, such that the removable lens element 108 will not substantially move in a side-to-side motion, up-and-down motion, front-to-back motion, or rotate relative to the lens-securing assembly 130 and the frame 128.

The removable lens element 108 includes means for securing the removable lens element 108 to the lens-securing assembly 130. For example, the removable lens element includes multiple contact surfaces 116 (illustrated here as having three such surfaces, although other amounts and configurations are contemplated and may be practiced within the scope of the present invention) for engagement with the lens-securing assembly 130 by resting on shoulders 132 of the frame, such that the removable lens element 108 is substantially stopped from moving in a downward direction and will not substantially rotate relative to the lens-securing assembly 130 and/or the frame 128 when the lens-securing assembly 130 is engaged.

The removable lens element 108 includes multiple bridge-engaging protrusions 118 (illustrated as having two although other amounts and configurations are contemplated) that each engages recesses 120 of the lens-securing assembly 130 by sliding thereinto, such that the removable lens element 108 generally cannot be substantially moved in a side-to-side direction, back-and-forth direction, or rotated relative to lens-securing assembly 130 and frame 128 when lens-securing assembly 130 is engaged with removable lens element 108.

Removable lens element 108 also includes at least engagement member, embodied in FIGS. 1-7 as a hole 114 (other numbers of engagement members are contemplated, as are other configurations; for example, the hole may be embodied as a recess engagement member rather than a void extending through the removable lens element 108) for the passing therethrough of a pin 124 configured to substantially prevent axial and linear movement, such that removable lens element 108 generally cannot move in a side-to-side, back-and-forth, and up-and-down direction relative to the lens-securing assembly 130 and frame 128 when the lens-securing assembly 130 is engaged therewith.

In the embodiments described, the removable lens element 108 cannot be removed from lens-securing assembly 130 unless lens-securing assembly 130 is disengaged. As such, the removable lens eyewear system 100 preferably provides a secure, tight, and stable connection between the frame 128 and the removable lens element 108 such that when lens-securing assembly 130 is engaged with the removable lens element 108, the removable lens element 108 is generally fixed such that there is no, or substantially no, axial, linear, or rotational movement relative to the lens-securing assembly 130 and the frame 128. Thus, the removable lens element 108 is generally fixed and connected to the lens-securing assembly 130 such that the removable lens element 108 will not substantially move in a side-to-side motion, up-and-down motion, front-to-back motion, or rotate relative to the lens-securing assembly 130 and the frame 128.

Figure 6:
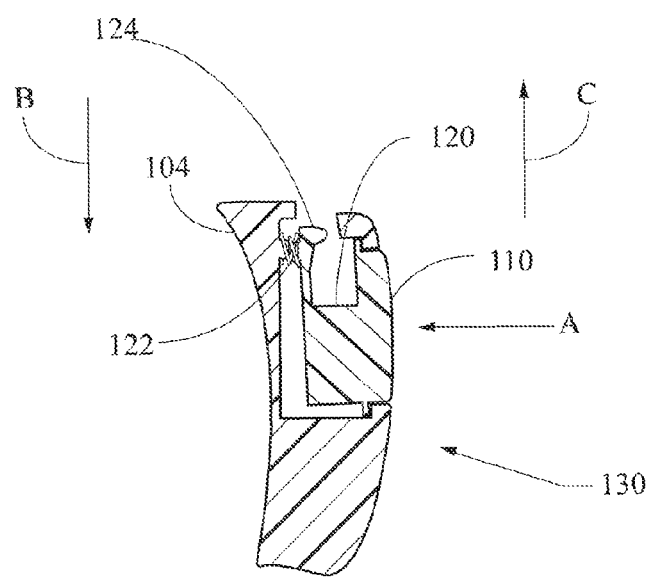
FIG. 6 illustrates a cross-sectional view of the lens-securing assembly embodiment, taken along the line 6-6 of FIG. 5.

FIG. 6 illustrates a cross-sectional view of an exemplary lens-securing assembly 130 for use with exemplary removable lens eyewear system 100. Referring to FIGS. 4-6, to disengage a lens-securing assembly 130, an actuation button 110 is disposed on the front face of the eyewear 100. It is biased into a default position by a resilient element, embodied here as a coil spring 122, but alternatively able to be embodied as—for example—a leaf spring, bent tang, a flexible element (such as one spring molded into the release element), an elastomeric insert, or any other resilient element and/or biasing means that one of ordinary skill in the art would recognize as satisfying the desired function herein for positioning the button 110 and pin 124. The actuation button 110 may be pushed in the direction of Arrow A causing the coil spring 122 to compress, thereby causing the pin 124 to retract into the lens-securing assembly 130 (and thereby disengage from the hole 114), such that the removable lens element 108 can be pulled up and out to be removed from the lens-securing assembly in the direction of Arrow C (illustrated in FIGS. 6-7). Thus, the coil spring 122 is configured to compress and retract the pin 124 when a force is applied to an actuation button 110 and is further configured to expand and extend the pin 124 when the force is removed. In the most preferred embodiments, an operation of the mechanism may be effected with a single hand of a user/wearer.

Figure 7:
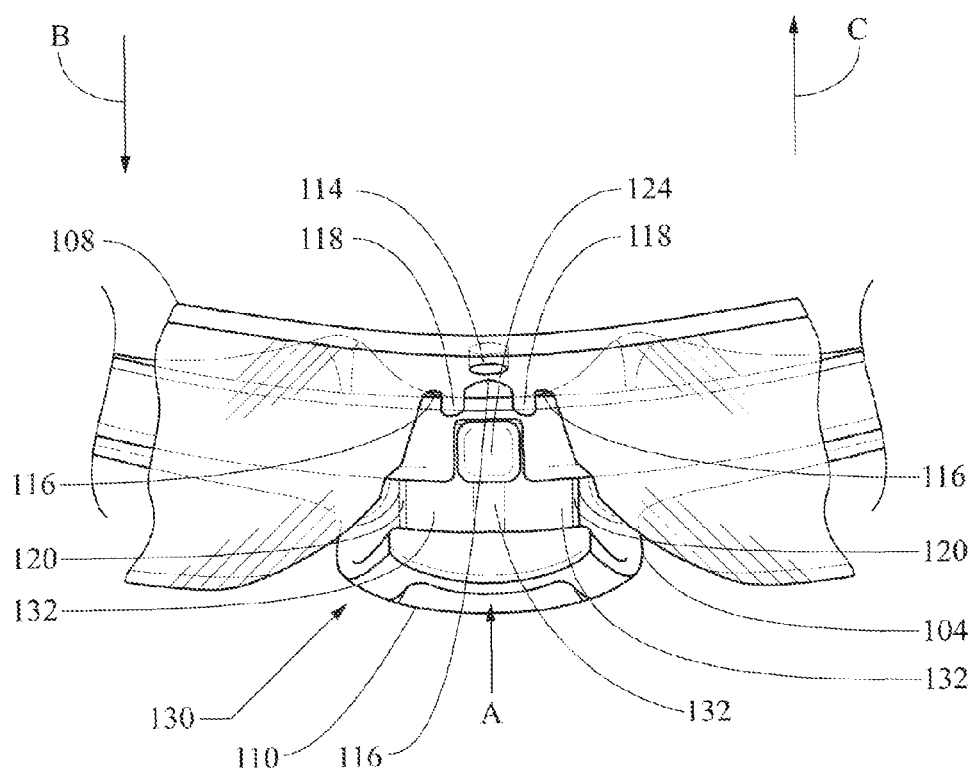
FIG. 7 illustrates a top perspective view of a removable lens assembly embodiment configured for engagement with a lens-securing assembly in the direction of Arrow B and removal in the direction of Arrow C, each facilitated by depression of a button in the direction of Arrow A.

FIG. 7 illustrates a top view of an exemplary removable lens element 108 with motion arrows to indicate actions associated engagement with and disengagement from an exemplary lens-securing assembly 130. Arrow B illustrates the direction of movement for inserting the removable lens 108 into the lens system, and Arrow C illustrates the direction of movement for removing the removable lens 108 from the lens system. When a force is applied to the actuation button 110, such as by being pressed in the direction of Arrow A, the pin 124 is moved to retract/regress into lens-securing assembly 130.

The removable lens element 108 may be slid down in the direction of Arrow B such that one of each of the bridge-engaging protrusions 118 slides into one of each of the recesses 120, and the points of contact 116 rest upon the shoulders 132. The actuation button 110 may then be released, causing the pin 124 to engage and move through/engage the hole 114. In this manner the removable lens element 108 may be secured and engaged by the lens-securing assembly 130 to the frame 128.

To disconnect the removable lens element 108, the actuation button 110 may be pressed in the direction of Arrow A, thus causing the pin 124 to retract into the lens-securing assembly 130. The removable lens element 108 may then be slid (in the direction of Arrow C) out from lens-securing assembly 130, thus disengaging removable lens element 108 from lens-securing assembly 130.

Lens-securing assembly 130 provides easy, one-handed operation for the engagement and disengagement of removable lens element 108. One-handed operation is desired for numerous reasons, including but not limited to—for example—ease of use for those with limited motor skills (e.g. a person who has only one functioning hand), ease of use during situations where a wearer's hand may otherwise be occupied (e.g., during military combat wherein it is undesired for a soldier to be distracted for an extended period of time to adjust eyewear—including changing a removable lens to adjust to different conditions, during a sporting event when a wearer may be wearing a glove or other equipment on one hand such as a baseball player changing from a sunlight-adapted lens to a lens configured for use under artificial lighting during gameplay, during a police operation where an officer's off-hand must hold her weapon), or other circumstances where convenience or necessity may make it advantageous to be able to remove and/or exchange a lens element.

It is contemplated that the lens-securing assembly 130 may be integrally built into frame 128, such as being injection molded to it, or lens-securing assembly 130 may be later added as a component part by attachment means, including but not limited to, a screw, adhesive, tape, glue, or welded thereto.

Figure 8:
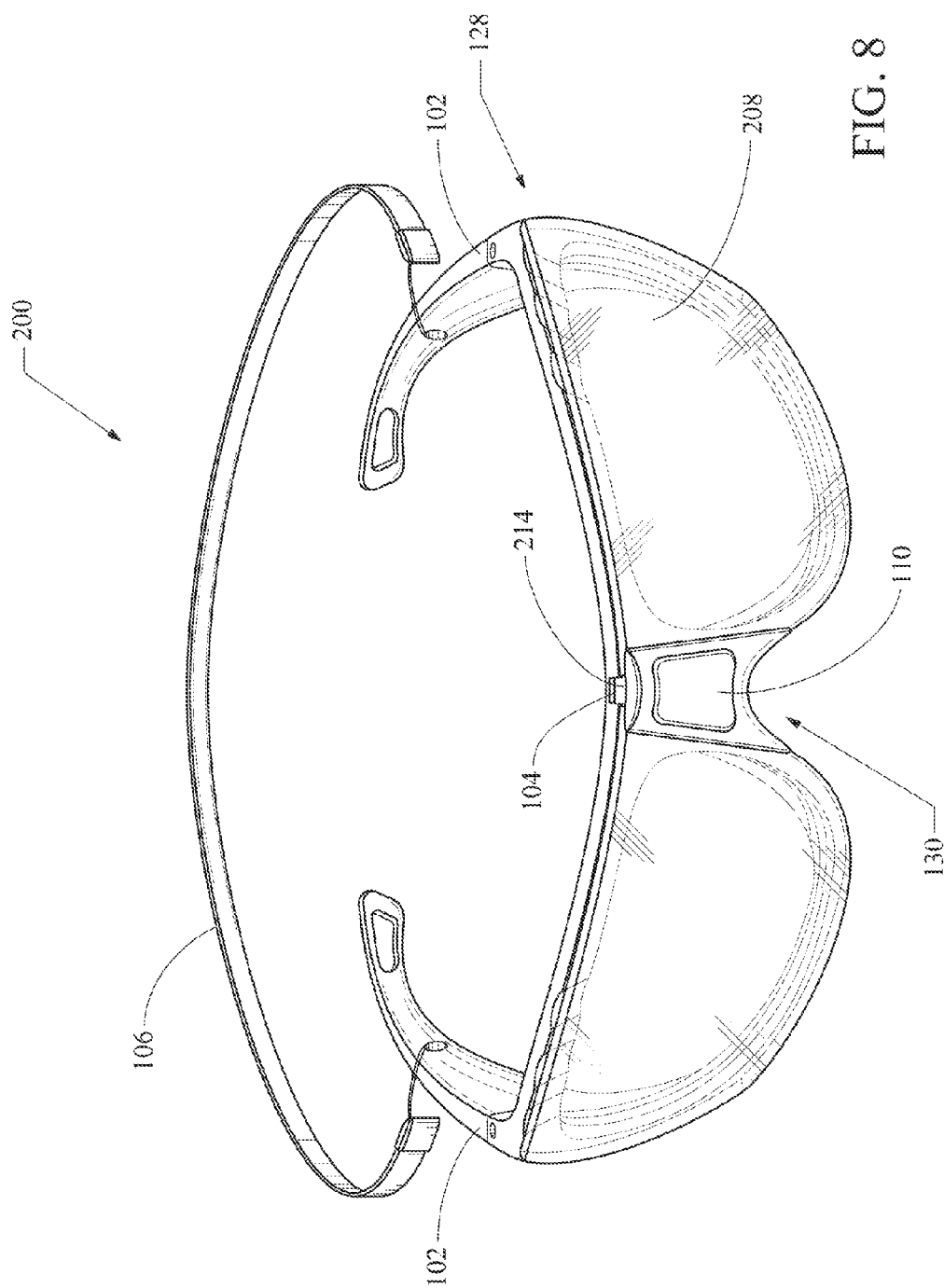
FIG. 8 illustrates a perspective view of another embodiment of removable lens eyewear system wherein the removable lens is engaged.
Figure 9:
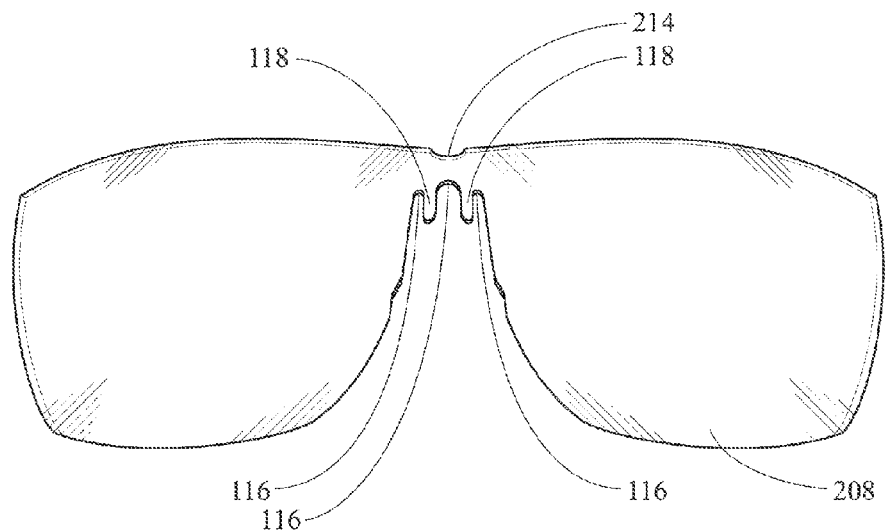
FIG. 9 illustrates a front view of another embodiment of a removable lens.
Figure 10:
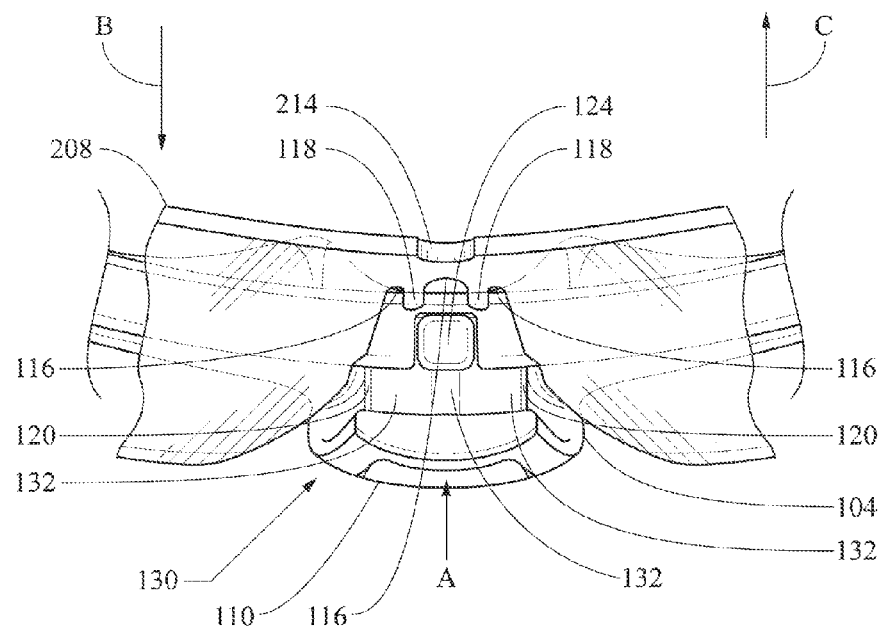
FIG. 10 illustrates a top perspective view of the removable lens assembly embodiment of FIG. 9, configured for engagement with a lens-securing assembly in the direction of Arrow B and removal in the direction of Arrow C, each facilitated by depression of a button in the direction of Arrow A.

Referring now to FIGS. 8-10. FIG. 8 illustrates an alternate embodiment of a perspective view of an exemplary removable lens eyewear system 200 wherein the removable lens 208 is engaged, FIG. 9 illustrates a front view of the same embodiment, and FIG. 10 illustrates a top view of the same embodiment wherein the removable lens 208 is capable of being slid into exemplary lens securing assembly 130 for engagement in the direction of Arrow B and removed by being pulled in the direction of Arrow C when actuation button 110 is pressed in the direction of Arrow A.

As illustrated in FIG. 8, the removable lens eyewear system 200 is like that illustrated in FIGS. 1, 3, and 7, and removable lens 208 is like that of removable lens 108, except the removable lens eyewear system 200 utilizes an engagement member embodied as a notch 214 (rather than a hole) for engagement with the pin 124 configured to substantially prevent axial and linear movement, such that the removable lens 208 generally cannot move in a side-to-side, back-and-forth, and up-and-down direction relative to the lens-securing assembly 130 and the frame 128 when the lens-securing assembly 130 is engaged therewith.

Indeed it is contemplated, although not required, that the removable lens elements 108, 208 can be configured as numerous removable lenses in whole or in part to serve different purposes so that the user can disconnect a removable lens that is no longer desired and connect a removable lens element 108, 208 that is desired. As such, certain embodiments may include an eyewear system including a frame 128 and a plurality of removable lens elements 108, 108 that may be interchanged.

For example, a user may disconnect a sun-protective prescription removable lens after coming indoors and connect a prescription removable lens. A golfer, for example, may disconnect a removable lens configured for increased vision when cloudy and connect a removable lens configured for increased vision when sunny. A doctor, for example, may disconnect a removable lens configured for protection from bodily fluids (such as blood) while performing a medical operation and connect a removable lens configured for protection from caustic chemicals (such as acid) when performing a laboratory experiment. A hunter, for example, may disconnect a removable lens configured for increased vision while in a wet region (such as a lake) and connect a removable lens configured for increased vision while shooting at a target (such as a yellow-tinted removable lens). A biker, for example, may disconnect a removable lens configured for driving a motorcycle and connect a removable lens configured for bicycling (such as an ultra-light aerodynamic lens). A military soldier, for example, may disconnect a removable lens configured for viewing a target site at night and connect a removable lens configured for viewing a target site inside a lit building. Indeed it is also contemplated, for example, that a removable lens may be disconnected when damaged and an undamaged removable lens then connected. Other scenarios are contemplated and are not limited to the examples listed, which are provided only as illustrations and not as limitations.

From the foregoing, it should be appreciated that the present novel system, which provides an eyewear system that minimizes or substantially prevents accidental or unintended removal, axial movement, linear movement, and rotational movement of a removable lens relative to an eyewear frame, such as in a side-to-side, up-and-down, back-and-forth, and rotational direction, and which also substantially prevents the unintended disconnection of the removable lens from the eyewear frame and provides many benefits, including but not limited to, increased user safety as the removable lens will not substantially move or disconnect when in use, including but not limited to, use during sporting events, while operating machinery, performing laboratory experiments, performing medical operations, when hunting, and when being used during military operations, and while at the same time the system provides easy, one-handed operation for the engagement and disengagement of the removable lens from the system.

Those of skill in the art will appreciate that embodiments not expressly illustrated herein may be practiced within the scope of the present invention, including that features described herein for different embodiments may be combined with each other and/or with currently-known or future-developed technologies while remaining within the scope of the claims presented here. It is therefore intended that the foregoing detailed description be regarded as illustrative rather than limiting. And, it should be understood that the following claims, including all equivalents, are intended to define the spirit and scope of this invention. Furthermore, the advantages described above are not necessarily the only advantages of the invention, and it is not necessarily expected that all of the described advantages will be achieved with every embodiment of the invention.

What is claimed is:

1. A removable lens eyewear system comprising:
   a frame comprising:
      a first temple,
      a second temple,
      a surface having a first portion, a second portion, and a middle portion between the first portion and the second portion, wherein the middle portion comprises a bridge, wherein the first portion is connected to the first temple and the second portion is connected to the second temple, and wherein the first portion and the second portion are configured for viewing therethrough;
   at least one removable lens comprising:
      a surface configured for viewing therethrough;
      an engagement member disposed about the surface; and
      a plurality of protrusions extending from the surface;
   a lens-securing assembly connected to the bridge, wherein the lens-securing assembly comprises:
      a pin;
      an actuation member in communication with the pin, wherein the actuation member is configured to position the pin in a retracted state when a force is applied to the actuation member such that the pin does not engage the engagement member of the removable lens, and wherein the actuation member is further configured to position the pin in an extended state when the force is removed such that the pin engages the engagement member of the removable lens; and
      a plurality of recesses configured for slideably receiving the plurality of protrusions of the removable lens.

2. The removable lens eyewear system of claim 1, wherein the actuation member further comprises a resilient element configured to compress and position the pin in the retracted state when a force is applied to the actuation member, and wherein the resilient element is further configured to expand and position the pin in the extended state when the force is removed.

3. The removable lens eyewear system of claim 1, wherein the actuation member is a button.

4. The removable lens eyewear system of claim 1, wherein the actuation member is a lever.

5. The removable lens eyewear system of claim 1, further comprising a plurality of lenses connected to the surface of the frame and configured for viewing therethrough.

6. The removable lens eyewear system of claim 1, wherein the frame further comprises a plurality of vents comprising surface waves in the first portion of the frame and the second portion of the frame, wherein the vents are configured for permitting the passage of air between the frame and the removable lens when the removable lens is engaged with the lens-securing assembly.

7. A lens-securing assembly comprising:
a pin;
an actuation member in communication with the pin, wherein the actuation member is configured to position the pin in a retracted state when a force is applied to the actuation member such that the pin does not engage a removable lens, and wherein the actuation member is further configured to position the pin in an extended state when the force is removed such that the pin engages a removable lens; and
a plurality of recesses configured for slideably receiving a plurality of protrusions of a removable lens;
wherein the lens-securing assembly is configured for attachment to a bridge of an eyewear frame.

8. The lens-securing assembly of claim 7, further comprising:
a removable lens comprising:
a surface configured for viewing therethrough;
an engagement member disposed about the surface configured for communication with the pin; and
a plurality of protrusions extending from the surface configured for slideable engagement with the plurality of recesses of the lens-securing assembly.

9. The lens-securing assembly of claim 8, wherein the engagement member of the removable lens comprises a hole or a notch.

10. The lens-securing assembly of claim 7, further comprising the eyewear frame.

11. The lens-securing assembly of claim 7, wherein the actuation member further comprises a resilient element configured to compress and position the pin in the retracted state when a force is applied to the actuation member, and wherein the resilient element is further configured to expand and position the pin in the extended state when the force is removed.

12. The lens-securing assembly of claim 7, wherein the actuation member is a button.

13. The lens-securing assembly of claim 7, wherein the actuation member is a lever.

14. A removable lens eyewear system comprising:
a removable lens; and
a lens-securing assembly configured for connection to a bridge of an eyewear frame, wherein the lens-securing assembly comprises an actuation means configured to engage and disengage the lens-securing assembly for a removable connection with the removable lens;
wherein the lens-securing assembly further comprises means for substantially preventing the side-to-side, up-and-down, back-and-forth, and rotational motion of the removable lens relative to the lens-securing assembly when the removable lens is engaged with the lens-securing assembly.

15. The removable lens eyewear system of claim 14, wherein the removable lens further comprises:
a surface configured for viewing therethrough;
an engagement member disposed about the surface and configured to engage the means for substantially preventing the side-to-side, up-and-down, back-and-forth, and rotational motion of the removable lens relative to the lens-securing assembly when the removable lens is connected to the lens-securing assembly; and
a plurality of protrusions extending from the surface configured to slideably engage the means for substantially preventing the side-to-side, up-and-down, back-and-forth, and rotational motion of the removable lens relative to the lens-securing assembly when the removable lens is connected to the lens-securing assembly.

16. The removable lens eyewear system of claim 14, further comprising an eyewear frame having a bridge configured for attachment to the lens-securing assembly.

17. The removable lens eyewear system of claim 14, wherein the means for substantially preventing the side-to-side, up-and-down, back-and-forth, and rotational motion of the removable lens comprises:
an actuation member in communication with a pin configured for engaging an engagement member of the removable lens and configured for disengaging an engagement member of the removable lens; and
a plurality of recesses configured for receiving a plurality of protrusions of the removable lens.

18. The removable lens eyewear system of claim 17, wherein the actuation member further comprises a resilient element configured to compress and position the pin in a retracted state when a force is applied to the actuation member, and wherein the resilient element is further configured to expand and position the pin in an extended state when the force is removed.

19. The removable lens eyewear system of claim 17, wherein the actuation member is a button.

20. The removable lens eyewear system of claim 17, wherein the actuation member is a lever.

* * * * *